United States Patent
Rajagopalan

(10) Patent No.: US 11,271,953 B1
(45) Date of Patent: Mar. 8, 2022

(54) DYNAMIC POWER USER IDENTIFICATION AND ISOLATION FOR MANAGING SLA GUARANTEES

(71) Applicant: NetSkope, Inc., Santa Clara, CA (US)

(72) Inventor: Chandrasekaran Rajagopalan, San Jose, CA (US)

(73) Assignee: NetSkope, Inc., Santa Clara, CA (US)

( * ) Notice: Subject to any disclaimer, the term of this patent is extended or adjusted under 35 U.S.C. 154(b) by 0 days.

(21) Appl. No.: 17/163,285

(22) Filed: Jan. 29, 2021

(51) Int. Cl.
*H04L 29/06* (2006.01)

(52) U.S. Cl.
CPC .......... *H04L 63/1416* (2013.01); *H04L 63/20* (2013.01); *H04L 2463/144* (2013.01)

(58) Field of Classification Search
CPC . H04L 63/1416; H04L 63/20; H04L 63/1458; H04L 63/1466; H04L 63/145; H04L 63/1441; H03L 63/1425
USPC .......................................................... 726/23
See application file for complete search history.

(56) References Cited

U.S. PATENT DOCUMENTS

| | | | |
|---|---|---|---|
| 6,574,655 | B1 | 6/2003 | Libert et al. |
| 7,996,373 | B1 | 8/2011 | Zoppas et al. |
| 8,127,365 | B1 | 2/2012 | Liu et al. |
| 8,130,747 | B2 | 3/2012 | Li et al. |
| 8,438,630 | B1 | 5/2013 | Clifford |
| 8,776,249 | B1 | 7/2014 | Margolin |
| 8,799,911 | B2 * | 8/2014 | Santoli ...................... G06F 9/46 718/101 |
| 9,069,992 | B1 | 6/2015 | Vaikar et al. |
| 9,258,274 | B2 * | 2/2016 | Hansen ............... H04L 63/1483 |
| 10,162,767 | B2 | 12/2018 | Spurlock et al. |
| 10,291,657 | B2 | 5/2019 | Narayanaswamy et al. |
| 10,349,304 | B2 | 7/2019 | Kim et al. |
| 10,594,730 | B1 | 3/2020 | Summers et al. |

(Continued)

FOREIGN PATENT DOCUMENTS

| | | |
|---|---|---|
| JP | 2012084141 A | 4/2012 |
| JP | 2015130112 A | 7/2015 |

(Continued)

OTHER PUBLICATIONS

U.S. Appl. No. 15/368,240, filed Dec. 2, 2016, U.S. Pat. No. 10,826,940, Nov. 3, 2020, Granted.

(Continued)

*Primary Examiner* — Longbit Chai
(74) *Attorney, Agent, or Firm* — Haynes Beffel & Wolfeld, LLP; Ernest J. Beffel, Jr.

(57) ABSTRACT

A method of avoiding throughput penalties imposed by SaaS vendors on a user group due to excessive API events from users in the group, monitoring API event rate or volume in time for requests from the group, collectively, and from individual users in the user group to a SaaS vendor is disclosed. Also, recognizing a power user as submitting API events in excess of a limit and taking action to reduce the user's impact on the API event rate of the group when the API rate for the group, overall, exceeds or approaches a SaaS imposed trigger of a throughput penalty on the group. Further included is rationing transmittal of API event submissions from the power user to the SaaS and avoiding triggering of the throughput penalty by the SaaS, reducing latency for the users in the group other than the power user and increasing latency for the power user.

23 Claims, 10 Drawing Sheets

(56) References Cited

U.S. PATENT DOCUMENTS

| | | |
|---|---|---|
| 2005/0289354 A1 | 12/2005 | Borthakur et al. |
| 2008/0127303 A1 | 5/2008 | Wrighton et al. |
| 2008/0216174 A1 | 9/2008 | Vogel et al. |
| 2010/0146269 A1 | 6/2010 | Baskaran |
| 2011/0047590 A1 | 2/2011 | Carr et al. |
| 2011/0131408 A1 | 6/2011 | Cook et al. |
| 2014/0007222 A1 | 1/2014 | Qureshi et al. |
| 2014/0026182 A1 | 1/2014 | Pearl et al. |
| 2015/0271207 A1 | 9/2015 | Jaiswal et al. |
| 2016/0269467 A1 | 9/2016 | Lee et al. |
| 2016/0275577 A1 | 9/2016 | Kolluri Venkata Sesha et al. |
| 2016/0277374 A1 | 9/2016 | Reid et al. |
| 2016/0285918 A1 | 9/2016 | Peretz et al. |
| 2016/0292445 A1 | 10/2016 | Lindemann |
| 2017/0063720 A1 | 3/2017 | Foskett et al. |
| 2017/0091482 A1 | 3/2017 | Sarin et al. |
| 2017/0099344 A1* | 4/2017 | Hadfield ............... G06F 16/182 |
| 2017/0264640 A1 | 9/2017 | Narayanaswamy et al. |
| 2018/0063182 A1 | 3/2018 | Jones et al. |
| 2018/0324204 A1 | 11/2018 | McClory et al. |
| 2020/0372040 A1 | 11/2020 | Boehmann et al. |

FOREIGN PATENT DOCUMENTS

| | | |
|---|---|---|
| WO | 2007009255 A1 | 1/2007 |
| WO | 2012058487 A2 | 5/2012 |
| WO | 2019226363 A1 | 11/2019 |

OTHER PUBLICATIONS

U.S. Appl. No. 15/368,246, filed Dec. 2, 2016, U.S. Pat. No. 11,019,101, May 25, 2021, Granted.
U.S. Appl. No. 16/000,132, filed Nov. 3, 2020, U.S. Pat. No. 10,291,657, May 14, 2019, Granted.
U.S. Appl. No. 16/409,685, filed May 10, 2019, U.S. Pat. No. 10,979,458, Apr. 13, 2021, Granted.
U.S. Appl. No. 16/783,146, filed Feb. 5, 2020, U.S. Appl. No. 16/783,146, Feb. 5, 2020, Granted.
U.S. Appl. No. 17/227,074, filed Feb. 5, 2020, Pending.
EP 19189235.5 Response to Rule 71(3), dated Dec. 17, 2020, 6 pages.
JP 2019081108 First Office Action, dated May 19, 2021, 7 pages.
Cheng et al, "Cloud Security for Dummies, Netskope Special Edition" John Wiley & Sons, Inc. 2015, 53 pages.
"Netskope Introspection," netSkope, Inc., 2015, 3 pgs.
"Data Loss Prevention and Monitoring in the Cloud" by netSkope, Inc., Nov. 2014, 18 pgs.
"Cloud Data Loss Prevention Reference Architecture", Sep. 2015, Netskope, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope The 15 Critical CASB Use Cases", Netskope, Inc., EB-141-1, 19 pages.
"Repave the Cloud-Data Breach Collision Course," netSkope, Inc., 2014, 6 pgs.
PCT/US2017/021969—International Search Report and Written Opinion dated Jun. 22, 2017, 11 pages.
Laminin Solutions: "Metadata Permissions Protects Confidential Information", Feb. 19, 2013, pp. 1-2 XP002770913.
Yague et al., "A Metadata-based access control model for web services", Computer Science Department, Internet Research, vol. 15, No. 1, University of Malaga, Malaga, Spain, Dec. 31, 2005, pp. 99-116, XP002770914.
Gowadia etal., "RDF Metadata for XML Access Control", Proceedings of the ACM Workshop on XML Security 2003. Fairfax, VA, Oct. 31, 2003, pp. 39-48, XP001198168.
Kuwabara etal., "Use of Metadata for Access Control and Version Management in RDF Database", Sep. 12, 2011, Knowledge-Based and Intelligent Information and Engineering Systems, Springer Berling Heidelberg, pp. 326-336, XP019164752.
PCT/US2017/021969—International Preliminary Report on Patentability dated Mar. 5, 2018, 13 pages.
U.S. Appl. No. 15/368,240—Office Action dated Aug. 7, 2018, 28 pages.
U.S. Appl. No. 16/000,132—Office Action dated Oct. 2, 2018, 18 pages.
U.S. Appl. No. 15/368,240—Response to Office Action dated Aug. 7, 2018, filed Oct. 11, 2018, 25 pages.
U.S. Appl. No. 16/000,132—Response to Office Action dated Oct. 2, 2018, filed Nov. 13, 2018, 16 pages.
U.S. Appl. No. 16/000,132—Notice of Allowance dated Dec. 28, 2018, 16 pages.
U.S. Appl. No. 15/368,240—Office Action dated Feb. 8, 2019, 28 pages.
JP-20185473875—Notice of Allowance with Allowed Claims dated Mar. 25, 2019, 7 pages.
EP-17713822.9, Rule 71(3) Allowance Communication dated Mar. 8, 2019, 147 pages.
PCT/US2019/031867—International Search Reoprt and Written Opinion dated Sep. 9, 2019, 20 pages.
EP-19189235.5 Extended European Search Report dated Nov. 27, 2019, 5 pages.
U.S. Appl. No. 15/368,240—Office Action dated Dec. 26, 2019, 40 pages.
U.S. Appl. No. 15/368,246—Office Action dated Apr. 5, 2019, 40 pages.
U.S. Appl. No. 15/368,246—Response to Office Action dated Apr. 5, 2019, filed May 3, 2019, 16 pages.
U.S. Appl. No. 15/368,246—Supplemental Response to Office Action dated Apr. 5, 2019, filed Oct. 25, 2019, 8 pages.
U.S. Appl. No. 15/368,240—Response to Final Office Action dated Feb. 8, 2019 filed Apr. 19, 2019, 32 pages.
Kark et al, "Trends: Calculating the Cost of a Security Breach", Forrester Research, Inc. Apr. 10, 2007, 7 pgs.
"Data Breach: The Cloud Multiplier Effect", Ponemon Institute, Jun. 4, 2014, 27 pages.
Riley et al, "Magic Quadrant for Cloud Access Security Brokers", Nov. 30, 2017, 28 pages, downloaded from <<https://go.netskope.com/typ-gartner-mq-for-casb.html>>.
Lakshman et al, "Cassandra—A Decentralized Structured Storage System", 2009, 6 pages.
DeCandia et al, "Dynamo: Amazon's Highly Available Key-value Store", SOSP '07, Oct. 14-17, 2007, 16 pages.
Chang et al, "Bigtable: A Distributed Storage System for Structured Data", Operating Systems Design and Implementation, OSDI, 2006, 14 pages.
U.S. Appl. No. 15/368,246—Office Action dated Jan. 27, 2020, 20 pages.
U.S. Appl. No. 16/783,146—Office Action dated Mar. 27, 2020, 26 pages.
U.S. Appl. No. 16/783,146—Response to Office Action dated Mar. 27, 2020, filed Jun. 4, 2020, 21 pages.
U.S. Appl. No. 16/783,146—Notice of Allowance dated Jun. 17, 2020, 13 pages.
U.S. Appl. No. 15/368,240—Notice of Allowance dated Jun. 29, 2020, 22 pages.
Sumit Khurana, et. al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.
U.S. Appl. No. 16/409,685—Office Action dated Jul. 14, 2020, 28 pages.
U.S. Appl. No. 15/368,246—Notice of Allowance dated Oct. 6, 2020, 22 pages.
PCT/US2019/031867—International Prelinary Report on Patentability dated Nov. 24, 2020, 12 pages.
U.S. Appl. No. 16/409,685—Notice of Allowance dated Dec. 3, 2020, 18 pages.
U.S. Appl. No. 15/368,240—Response to Office Action dated Dec. 26, 2019, filed May 26, 2020, 12 pages.

(56) References Cited

OTHER PUBLICATIONS

U.S. Appl. No. 15/368,246—Response to Office Action dated Jan. 27, 2020, filed May 25, 2020, 16 pages.
U.S. Appl. No. 16/409,685—Response to Office Action dated Jul. 14, 2020, filed Oct. 14, 2020, 9 pages.
U.S. Appl. No. 16/411,039—Office Action dated Feb. 10, 2021, 13 pages.
EP 19189235.5 Rule 71(3)—Intent to Grant, dated Dec. 17, 2020, 7 pages.

* cited by examiner

|    | w1 | w2 | w3 | w4 | w5 | w6 | w7 |
|----|----|----|----|----|----|----|----|
| u1 | 1  | 5  | 2  | 5  | 6  | 4  | 1  |
| u2 | 10 | 3  | 0  | 0  | 3  | 1  | 3  |
| u3 | 40 | 20 | 40 | 5  | 40 | 20 | 25 |
| u4 | 2  | 3  | 20 | 3  | 4  | 7  | 6  |

```
{
  "event_type": "ITEM_UPLOAD",    ─── 514
  "source": {
    "item_status": "active",
    "content_created_at": "2019-04-23T04:55:37-07:00",
    "id": "446613841323",
    "size": 1638,
    "modified_by": {
      "login": "chandra.ns@netskope.com",  ─── 534
      "type": "user",
      "id": "1633262496",    ─── 544
      "name": "Netskope"
    },
    "file_version": {
      "sha1": "594b79f211940b84452c920b6d6e6c75d2a0436a",
      "type": "file_version",
      "id": "472472989323"
    },
    "created_by": {
      "login": "chandra.ns@netskope.com",
      "type": "user",
      "id": "1633262496",
      "name": "Netskope"
    },
    "etag": "0",
    "purged_at": None,
    "shared_link": None,
    "path_collection": {
      "total_count": 1,
      "entries": [
        {
          "sequence_id": "0",
          "etag": "0",
          "type": "folder",
          "id": "74622731608",
          "name": "WebhookTest"
        }
      ]
```

FIG. 5A

```
    "trashed_at": None,
    "content_modified_at": "2019-04-23T04:55:37-07:00",
    "sequence_id": "0",
    "collaborators": {
      "next_marker": "",
      "previous_marker": "",
      "entries": []
    },
    "sha1": "594b79f211940b84452c920b6d6e6c75d2a0436a",
    "name": "box_poll_notif.txt",
    "type": "file",
    "created_at": "2019-04-25T01:46:08-07:00",   ─── 548
    "modified_at": "2019-04-25T01:46:08-07:00",
    "owned_by": {
      "login": "chandra.ns@netskope.com",
      "type": "user",
      "id": "1633262496",
      "name": "Netskope"
    }
  },
  "event_id": "8cdd744f-d2b5-49e9-86a0-fb5169909ed",
  "created_at": "2019-04-25T01:46:08-07:00",
  "created_by": {
    "login": "chandra.ns@netskope.com",
    "type": "user",
    "id": "1633262496",
    "name": "Netskope"
  },
  "event_stream": True,
}
```

FIG. 5B

```
{
  "event_type": "ITEM_CREATE",                                              /604
  "source": {
    "item_collection": {
      "total_count": 0,
      "offset": 0,
      "limit": 100,
      "order": [
        {
          "direction": "ASC",
          "by": "type"
        },
        {
          "direction": "ASC",
          "by": "name"
        }
      ],
      "entries": []
    },
    "item_status": "active",
    "content_created_at": "2019-05-22T22:32:42-07:00",
    "id": "77367625560",
    "size": 0,
    "modified_by": {
      "login": "chandra.ns@netskope.com",
      "type": "user",
      "id": "1633262496",
      "name": "Netskope"
    },
```

FIG. 6A

```
    "created_by": {
      "login": "chandra.ns@netskope.com",
      "type": "user",
      "id": "1633262496",
      "name": "Netskope"
    },
    "etag": "0",
    "purged_at": None,
    "folder_upload_email": None,
    "shared_link": None,
    "path_collection": {
      "total_count": 1,
      "entries": [
        {
          "sequence_id": "0",
          "etag": "0",
          "type": "folder",
          "id": "74622731608",
          "name": "WebhookTest"
        }
      ]
    },
    "description": "",                                                       /664
    "parent": {
      "sequence_id": "0",
      "etag": "0",
      "type": "folder",
      "id": "74622731608",
      "name": "WebhookTest"
    },
```

FIG. 6B

```
    "trashed_at": None,
    "content_modified_at": "2019-05-22T22:32:42-07:00",
    "sequence_id": "0",
    "collaborators": {
      "next_marker": "",
      "previous_marker": "",
      "entries": []
    },
    "name": "test",
    "type": "folder",
    "created_at": "2019-05-22T22:32:42-07:00",
    "modified_at": "2019-05-22T22:32:42-07:00",
    "owned_by": {
      "login": "chandra.ns@netskope.com",
      "type": "user",
      "id": "1633262496",
      "name": "Netskope"
    }
  },
  "event_id": "7cdfde23-a647-4129-a604-8d6606b1acff",        /674
  "created_at": "2019-05-22T22:32:42-07:00",
  "created_by": {
    "login": "chandra.ns@netskope.com",
    "type": "user",
    "id": "1633262496",
    "name": "Netskope"
  },
  "event_stream": True,                                       /684
}
```

FIG. 6C

DYNAMIC POWER USER IDENTIFICATION AND ISOLATION FOR MANAGING SLA GUARANTEES

INCORPORATIONS

The following materials are incorporated by reference in this filing:

U.S. Non Provisional application Ser. No. 14/198,508, entitled "Security For Network Delivered Services", filed Mar. 5, 2014 (now U.S. Pat. No. 9,270,765, issued Feb. 23, 2016);

U.S. Non Provisional application Ser. No. 15/368,240 entitled "Systems and Methods of Enforcing Multi-Part Policies on Data-Deficient Transactions of Cloud Computing Services", filed Dec. 2, 2016 (now U.S. Pat. No. 10,826,940, issued Nov. 3, 2020) and U.S. Provisional Application 62/307,305 entitled "Systems and Methods of Enforcing Multi-Part Policies on Data-Deficient Transactions of Cloud Computing Services", filed Mar. 11, 2016;

"Cloud Security for Dummies, Netskope Special Edition" by Cheng, Ithal, Narayanaswamy, and Malmskog, John Wiley & Sons, Inc. 2015;

"Netskope Introspection" by Netskope, Inc.;

"Data Loss Prevention and Monitoring in the Cloud" by Netskope, Inc.;

"The 5 Steps to Cloud Confidence" by Netskope, Inc.;

"Netskope Active Cloud DLP" by Netskope, Inc.;

"Repave the Cloud-Data Breach Collision Course" by Netskope, Inc.; and

"Netskope Cloud Confidence Index™" by Netskope, Inc.

FIELD OF THE TECHNOLOGY DISCLOSED

The technology disclosed generally relates to avoiding throughput penalties imposed by software as a service (SaaS) vendors on a user group of an organization due to excessive application programming interface (API) events from users in the user group, for security and regulatory compliance. More specifically, the disclosed technology relates to dynamic power user identification and isolation for managing service level agreement (SLA) guarantees.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud services for corporate functionality is common. Research suggests that eighty percent of enterprise workloads will be in the cloud by 2025. According to International Data Corporation, "spending on public cloud information technology (IT) infrastructure surpassed spending on traditional IT infrastructure for the first time in the second quarter of 2020." For example, enterprise companies often utilize software as a service (SaaS) solutions instead of installing servers within the corporate network to deliver services.

Enterprise companies typically utilize SaaS solutions instead of installing servers within the corporate network to deliver services. The providers of the SaaS solutions offer a service level agreement (SLA), between the service and a customer, which sets the expectations of assured availability, performance, security and privacy of the customer's data. In turn, the customer expects to be able to collaboratively create, edit and save their data securely among multiple customer branches and data centers.

In one example of the need for sufficient security services, in 2020, the global pandemic caused an abrupt shift to remote work among enterprise knowledge workers, which in turn resulted in an increase in risky behavior. Attackers tried to capitalize on the pandemic, with COVID-19-themed phishing emails, scams and Trojans. During this time interval, techniques used in more sophisticated cyberattacks also continue to evolve. The applicant reports that attackers shifted techniques for initial delivery, with malicious Microsoft Office document files increasing more than six-fold to match or exceed portable executable files in popularity. Attackers continue to abuse popular cloud apps and services to deliver malicious files to their victims in the enterprise, with more than fifty percent delivered through the cloud.

In addition to the use of SaaS apps by human users, SaaS apps are also integrated with bots or scripts which generate updates to the objects in the SaaS apps. These updates are received as notifications to be identified and inspected to ensure secure service. Meanwhile SaaS apps can impose rate limits on factors such as the number of API calls made on behalf of the user per unit of time, so the number of operations performed on behalf of a user is a factor of the number of API calls allowed for the user per unit of time. API calls are a scant resource to be used efficiently, which motivates the usefulness of limiting operations created in the worker to the quantity of work that can be performed for the user. Creating operations and scheduling to the worker blindly for the users and notifications would lead to head of line blocking, causing processing of other users' notifications to be delayed.

An opportunity arises for avoiding throughput penalties imposed by SaaS vendors on a user group due to excessive API events from users in the user group, in response to service level agreements (SLAs) on behalf of organizations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 depicts an example table of API event counts in time windows for multiple users, for tracking of users' impact on the API event rate.

FIG. 5A and FIG. 5B list an exemplary pushed notification received from a third party SaaS vendor for a network event, with the notification metadata in a JSON-style representation.

FIG. 6A, FIG. 6B and FIG. 6C list exemplary metadata for a network event 'item create 604 in a JSON-style representation.

DETAILED DESCRIPTION

Figure 1:
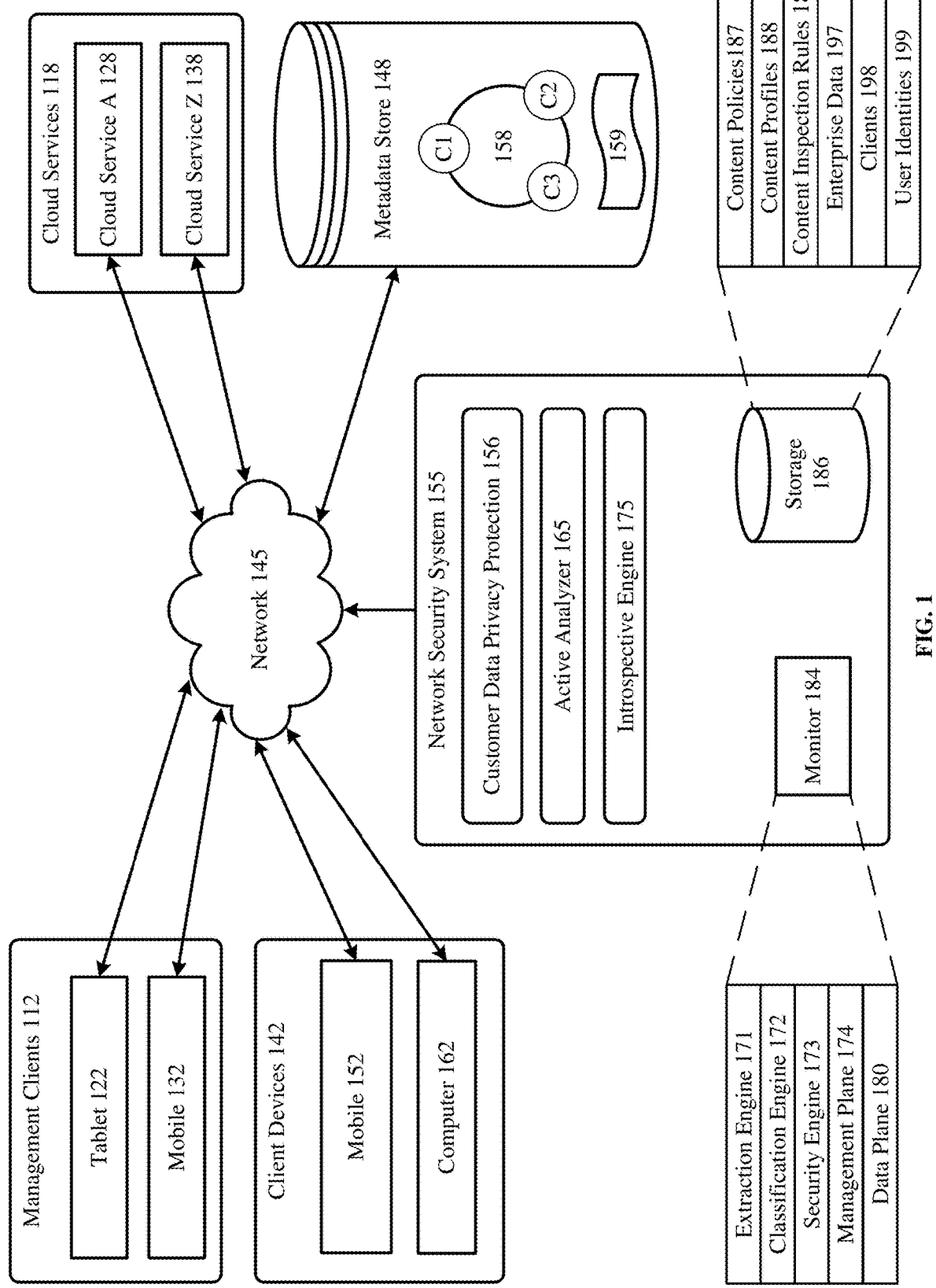
FIG. 1 illustrates an architectural level schematic of a system for avoiding throughput penalties imposed by SaaS vendors on a user group due to excessive API events from users in the user group, in accordance with an implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

SaaS apps are used by real users, and the SaaS apps are also integrated with bots or scripts which generate updates to the objects in the SaaS apps. The updates are received from SaaS apps as notifications.

SaaS apps impose rate limits for API events, and can impose rate limits based on several factors. One of the common factors for rate limits is based on the user. The number of API events on behalf of the user, per user, can be limited. SaaS apps impose rate limits for API events on behalf of the user per unit of time, so the number of operations performed on behalf of a user is a factor of the number of API events allowed for the user per unit of time. That is, API events are a scant resource to be used efficiently, which drives the usefulness of limiting operations created in the worker process to the quantity of work that can be performed for the user. Creating operations and scheduling to the worker process blindly for the users and notifications can lead to head of line blocking—a performance-limiting phenomenon that occurs when a line of packets is held up by the first packet, causing processing of other users' notifications to be delayed.

In the past, the approach for managing SLA guarantees has been to react to the rate limit imposed by the external application. While important, this approach does not have enough of an impact to improve resource usage enough to guarantee the service level agreement (SLA) for other users who should not be impacted by another user's usage.

The technology disclosed solves the technical problem of avoiding throughput penalties imposed by SaaS vendors on a user group due to excessive API events from users in the user group, typically of an organization. The approach disclosed by the applicant monitors API event rate for request from the user group and from individual users in the user group to a SaaS vendor, and recognizes a power user as submitting API events in excess of a limit and taking action to reduce the power user's impact on the API event rate of the user group. Once the user has been recognized as a power user, the information gets fed back to the scheduler, which can take an action that disallows the user from continuing the operations intended, based on the rate at which the power user carries out the operations. In one example, the action is to throttle the specific user's notifications workload and ensure that the resources are utilized usefully for other users' notification processing. This approach benefits the system throughput and the organization, also referred to as the customer, because the SLA guarantees for the other users can be maintained, after the power user is identified and their use is throttled to the SLA guarantees which are based on the API quotas available per user. Configurable actions can be set up by an admin as policies that alienate the user from further processing, and can alert the admin if a policy for alerts has been set up. In some embodiments, another configurable policy action can be to create a separate queue for the power user for processing their notifications, to protect the resources needed by the other users in the organization.

An example system for avoiding throughput penalties imposed by SaaS vendors on a user group due to excessive API events from users in the user group of an organization is described next.

System

FIG. 1 shows an architectural level schematic of a system 100 for improving near real time access to SaaS APIs on behalf of an organization. System 100 includes network security system 155, management clients 112, cloud services 118, client devices 142 and public network 145. Network security system 155 includes customer data privacy protection 156, active analyzer 165, introspective engine 175, monitor 184 and storage 186. Monitor 184 of network security system 155 includes extraction engine 171, classification engine 172, security engine 173, management plane 174 and data plane 180. Management clients 112 include tablet 122 and mobile 132, cloud services 118 includes cloud service A 128 through cloud service Z 138, and client devices 142 include mobile 152 and computer 162. Active analyzer 165 enforces policies in real-time on sensitive content using monitor 184 when the sensitive content traverses the network 145. Storage 186 includes content policies 187, content profiles 188, content inspection rules 189, enterprise data 197, information for clients 198 and user identities 199. User identity refers to an indicator that is provided by the network security system to the client device, in the form of a token, a unique identifier such as a UUID, a public-key certificate, or the like. In some implementations, the user identity can be linked to a specific user and a specific device; thus, the same individual can have a different user identity on their mobile phone vs. their computer. The user identity can be linked to an entry or userid corporate identity directory, but is distinct from it. In one implementation, a cryptographic certificate signed by the network security is used as the user identity. In other implementations, the user identity can be solely unique to the user and be identical across devices.

Continuing with the description of system 100, in some implementations, storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document.

In the interconnection of the elements of system 100, network 145 couples management client tablet 122 and mobile 132, client device mobile 152 and computer 162, cloud service A 128 through cloud service Z 138, and network security system 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, network security system 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing network security system 155 on direct physical computers or traditional virtual machines. Additionally, one or more engines can be used and one or more points of presence (POPs) can be established to implement the security functions. The engines can be of varying types including a workstation, server, computing cluster, blade server, server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs is hosted on the client's premises or located in a virtual private network controlled by the client.

Continuing the description of FIG. 1, system 100 includes network security system 155 with customer data privacy protection 156 which accesses a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 118 and client devices 142. Although we use the term "network security system" to describe network security system 155, more generally the system provides application visibility and control functions as well as security. In one example, thirty-five thousand cloud applications are resident in libraries that intersect with servers in use by client devices 142.

The management clients 112 are computing devices with a web browser with a secure web-delivered interface provided by network security system 155 to define and administer content policies 187, according to one implementation. Network security system 155 is a multi-tenant system, so a user of a management client can only change content policies 187 associated with their organization, according to some implementations. In some implementations, APIs can be provided for programmatically defining and or updating policies. In such implementations, management clients 112 can include one or more servers, for example a corporate identities directory such as Microsoft Active Directory, Google Drive file storage and synchronization service or Slack business communications platform pushing updates, and/or responding to pull requests for updates to content policies 187. Both systems can coexist; for example, some companies may use a corporate identities directory to automate identification of users within the organization while using a web interface for tailoring policies to their needs. Management clients are assigned roles and access to the network security system 155 data is controlled based on roles, e.g. read-only vs. read-write.

A control plane may be used along with or instead of management plane 174 and data plane 180. The specific division of functionality between these groups is an implementation choice. Similarly, the functionality can be highly distributed across a number of points of presence (POPs) to improve locality, performance and/or security. In one embodiment of the disclosed technology, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Network security system 155 monitors interactions by users with tens of thousands of cloud-based applications, generating metadata from raw event data, with information gleaned from the cloud application transactions passing through the system. Customer data privacy protection 156 in network security system 155 accepts live network traffic from client devices 142 and generates event metadata on an ongoing basis, to represent events, such as login, file uploads and logout, and including metadata that identifies which users are utilizing which cloud apps. Live network traffic that corresponds to a cloud app interaction stimulates creation of an event, which includes user info, including which app is in use, from which IP address the log entry arrives. The cloud service detection and content-based function or activity identification uses algorithm-based traffic analysis that discovers cloud services interfacing with an organization's network by deep inspecting services transactions in real time, including calls made to the services. The technology disclosed uses connectors or standardized integrations to interpret the transactions between client devices 142 and cloud services 118. The transactions are decomposed to identify the activity being performed and its associated parameters. The transactions are represented as JSON files, which include a structure and format that allow monitor 184 to interpret what actions a user is performing in the cloud service as it is happening.

In some implementations, the gathered metadata is processed and/or normalized. In some instances, metadata includes structured data and functionality targets specific data constructs provided by the cloud services 118. Non-structured data, such as free text, can also be provided by, and targeted back to, the cloud services 118. Introspective engine 175 is capable of aggregating both structured and non-structured data. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 148 like Apache Cassandra™ 158, Google's BigTable™, HBase™ Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation, introspective engine 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parting or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective engine 175 are not homogenous (e.g., there are many different sources in many different formats), certain implementations employ at least one metadata parser per cloud service, and in some cases more than one. In other implementations, introspective engine 175 uses monitor 184 to inspect the cloud services and assemble content metadata.

Figure 2:
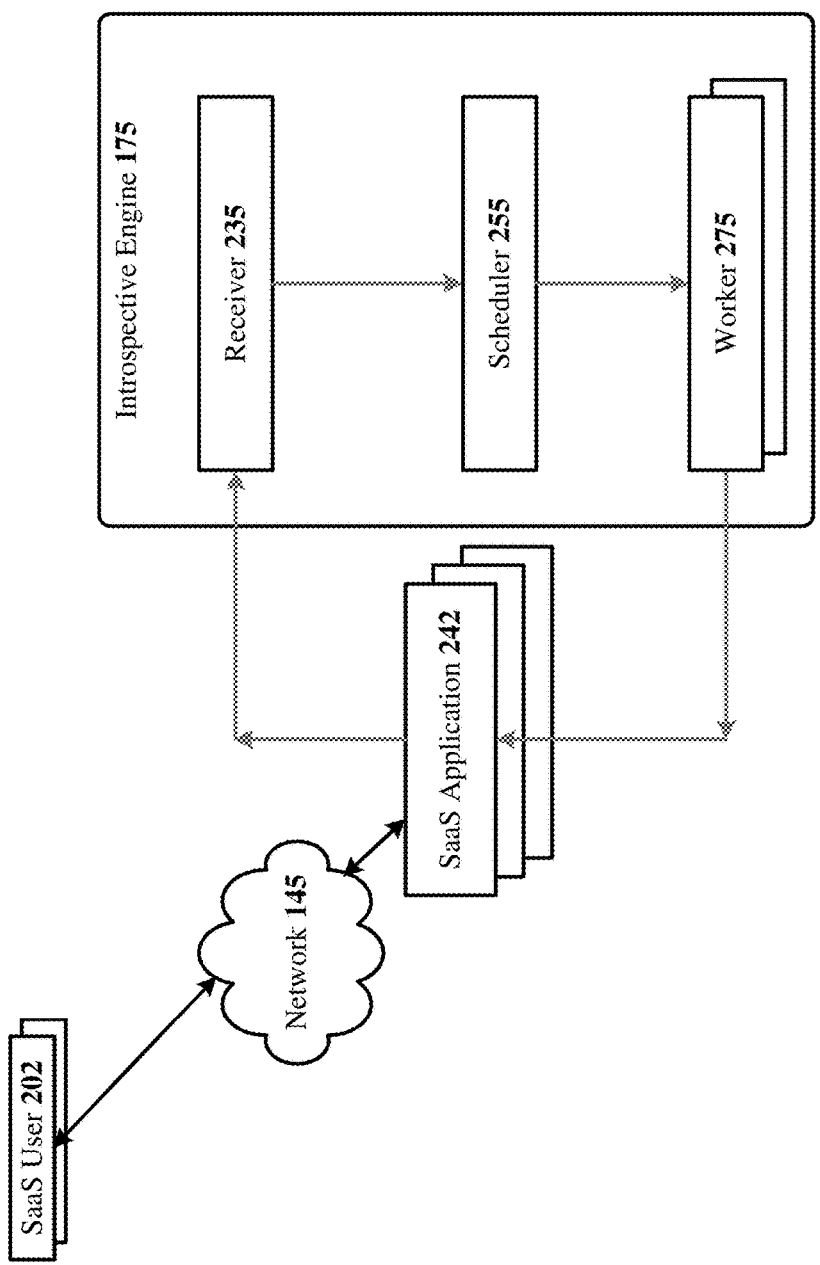
FIG. 2 illustrates a high level block diagram of the flow of user data representing SaaS application events for introspection.

FIG. 2 illustrates a high level block diagram 200 of the flow of user data representing SaaS application events for introspection. SaaS user 202 utilizes SaaS application 242 via network 145. SaaS user 202 can operate any of a variety of devices of management clients 112, such as tablet 122 and mobile 132, and can operate from client devices 142 such as mobile 152 and computer 162. Example third party managed cloud SaaS apps include Office 365, Box cloud content management, Salesforce, Google Workplace and Amazon Web Services (AWS). SaaS apps can impose rate limits for API calls, based on the service level agreement (SLA) of an identified user and the number of API calls made on behalf of the user, per unit of time, or based on the SLA for an organization and the number of API calls made by a group of users in the organization. SaaS application 242 pushes notifications that represent events. Notification metadata for sample events is illustrated in FIG. 5A and FIG. 5B and FIG. 6A, FIG. 6B and FIG. 6C and the example events are described later in this document.

Continuing the description of block diagram 200, introspective engine 175 receives notifications of user events from SaaS applications 242 at receiver 235, on behalf of the user or the administrator of the instance or account. SaaS applications 242 are also integrated with bots or scripts which generate updates to the objects in the SaaS apps via API calls. In one example, a sync application or download bot generates many potential API call events, such as 10,000 operations in one sequence, which can produce a series of operations for a single user within the organization. The single queue can lead to delay of the light-demand users, due to a single heavy-demand user. Introspective engine 175 also receives these updates as notifications. Introspective engine 175 identifies the updates and acts on them. Receiver 235 receives and evaluates the pushed notifications which trigger compliance checking of users and identification of power users. Receiver 235 sends notifications to scheduler 255 which schedules processing to worker 275 that processes the data stream in connection with SaaS application 242. The number of operations performed by a third party SaaS vendor on behalf of a user is related to the number of API calls allowed for the user per unit of time, as one aspect of managing SLA contracts, described earlier. The disclosed technology identifies the user(s) that generate more notifications than the number that can be processed. This alleviates the issue that would occur due to creating operations and scheduling work at worker 275 without information about the number of operations the worker can perform per unit time for the users, as an overwhelming number of notifications would lead to head of line blocking and cause processing of other users' notifications to be delayed.

Figure 3:
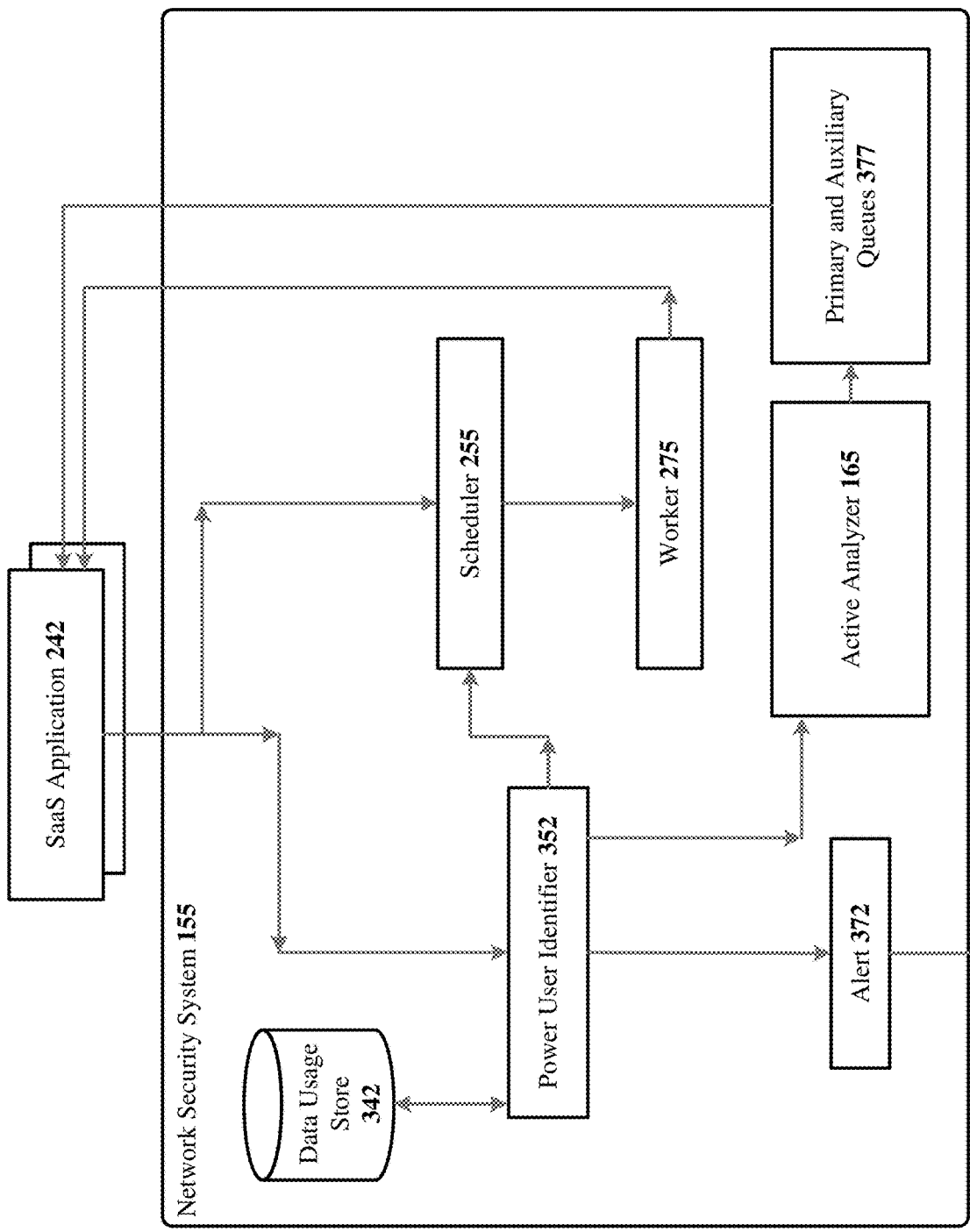
FIG. 3 illustrates a block diagram for identifying a power user who generates more notifications than can be processed per unit time, in accordance with the SLA contract for the user.

FIG. 3 illustrates a block diagram 300 for identifying a power user who generates more notifications than can be processed per unit time, in accordance with the SLA contract for the user. Network security system 155 uses power user identifier 352 to uniquely identify power users using the login and ID in the notification metadata, and for monitoring the API event rate for requests from the user group, collectively, and from individual users in the user group, to a SaaS vendor. In one case, SaaS application 242 sends notifications for API events from users in a user group to power user identifier 352 and to scheduler 255. Power user identifier 352 recognizes a power user as submitting API events in excess of a limit, and can determine when an identified user is consuming more than their allotted number of operations per unit time as specified in the organization's SLA. Power user identifier 352 feeds the identity of the power user to scheduler 255, which can take action based on the feedback, and generates an alert 372 for an identified power user. Action options are described later in this document. Scheduler 255 takes into account information from power user identifier 352 and the results of tracking the user's data usage when scheduling notification processing by worker 275. In another case, one or more active analyzers 165 monitor the API event rate or volume in time based on counting of API event requests being submitted to the SaaS vendor via primary and auxiliary queues 377. Power user identifier 352 maintains a sliding window for tracking data usage for each user, and at regular time increments, stores the data usage value for each user as an entry in a table in data usage store 342.

FIG. 4 depicts an example table of API event counts in time windows for multiple users, for tracking of users' impact on the API event rate. The table depicts seven sequential time windows for four users for tracking of users' API event rate over time. Each time SaaS application 242 sends a notification to power user identifier 352, the API event rate and volume get updated in data usage store 342. To recognize a power user, for each user represented in a distinct row of the table shown in FIG. 4, a running sum of values of the previous n windows plus the value added in the current window is calculated. If the sum is greater than a configurable threshold value, then the user is identified as a power user for the next specified amount of time, x. At the end of time period x, the user can be reset from power user to normal user. The user can be marked as a power user each time the sum of values of a configured number of sequential time windows, that is, their data usage, is greater than a threshold value over a sliding window of interest. In FIG. 4, four users: u1, u2, u3 and u4 are actively generating events. The number of notifications received in each of the seven time windows: w1, w2, w3, w4, w5, w6 and w7 for each of the four users is listed in the rows of the table. In this example, a configured policy specifies that a power user is defined as a user who uses more than a threshold value of one hundred in the most recent five consecutive slots. The value of the limit is configured to a particular value, based on the value that exceeds or approaches a SaaS imposed trigger of a throughput penalty on the user group. In this example, power user identifier 352 generates alert 372 because the sum for u3 of the number of notifications in five consecutive time windows 455 (shaded) is 4+20+40+5+40=109. The user u3 is designated a power user due to submitting API events in excess of the limit set in this example of one hundred. When a user is recognized as a power user, transmittal of API event submissions from the power user to the SaaS are rationed to avoid triggering of a throughput penalty by the SaaS. In some case, the power user is a bot programmed to generate the API events.

The overall effect of this disclosed method is to reduce latency for the users in the user group other than the power user, and increase latency for the power user. The policy that describes a power user is configurable for an organization by a human administrator, and represents the requirements of the SLA contract for the organization, in one embodiment.

Introspective engine 175 monitors a range of operations that cause SaaS application 242 to generate API event notifications, including create file, edit file and share file. Files can be shared via the use of collaborate, with options to add user, create link, delete user, delete link, and give permission for user to edit, view, share or unshare. Additional operations include copy, move, download and lock via create lock and delete lock. More operations include delete, undelete, open, preview and metadata update, which are used occasionally. Typically one API call is used for one operations and the one API call corresponds to a single API event.

FIG. 5A and FIG. 5B list an exemplary pushed API notification received from a third party SaaS vendor for a network event, with the notification metadata in a JSON-style representation. The user is uniquely identifiable, using login 534 and ID 544, as requesting event type 'item upload' 514. The push notification metadata file shown in FIG. 5A and FIG. 5B is not exhaustive of the event-related fields that can be captured in a metadata file, but rather highlights key fields. Power user identifier 352 utilizes 'time created at' 548 when calculating the sliding table entries for user identified by login 534 and id 544.

FIG. 6A, FIG. 6B and FIG. 6C list exemplary metadata for a network API event 'item create' 604 in a JSON-style representation. The unique identifier for the user is captured by login 674 and ID 684, and power user identifier 352 utilizes time 'content created at' 664 for calculating the count of notifications per unit time for identifying power users.

Actions can be configured in response to the API event rate exceeding or approaching a SaaS imposed trigger of a throughput penalty on the user group. A user can be alienated from further processing if the admin has set up a policy to select that option. One action option is to slow the specific user's notification workloads and ensure that the resources are utilized usefully for other users' notification processing. That is, rationing transmittal of API event submission from the power user to the SaaS can be done by cutting off the power user from making API event submissions to the SaaS. The cutting off of the identified power user can be for a predetermined time or until overall submissions by the user group no longer exceed the SaaS imposed trigger. In another action option, rationing can be done by temporarily suspending the power user from making API event submissions to the SaaS. The temporarily suspending can be for a predetermined time or until overall submissions by the user group no longer exceed the SaaS imposed trigger. In some cases, the actions by a user can violate policy. In this case, the configured policy can cause the user to be suspended until the human admin determines that a different action is warranted. In one example, a user can add a shared link to a file, such as a link to Box. Anyone with the shared link can access the file which means that the file is considered public. An example is listed next for adding a shared link to a file:

curl --location --request PUT 'https://api.box.com/2.0/files/12345?fields=shared_link' \
   --header 'Content-Type: application/json' \
   --header 'Authorization: Bearer {{access_token_redacted}}' \
   --data-raw '{
   "shared_link": {
   "access": "open",
   "password": "very-strong-password",
   "vanity_name": "my-shared-link",
   "unshared_at": "2021-12-12T10:53:43-08:00",
   "permissions": {
   "can_download": true
   }
   }
   }'

An API event initiated by the security policy enforcement or an admin can successfully set the link to Null, so that the original link becomes invalid and the file is not accessible publicly, thereby enforcing the enterprise policy. Typically this type of policy is set to match any file that has sensitive content that is not expected to be posted publicly. Code for removing a shared link on a file is listed next.

curl --location --request PUT 'https://api.box.com/2.0/files/12345?fields=shared_link' \
   --header 'Content-Type: application/json' \
   --header 'Authorization: Bearer {{access_token_redacted}}'\
   --data-raw '{
   "shared_link": null
   }'

Another action option can be to alert the admin, sending a notification to a human user to follow up on the cut-off or temporarily suspending. Security policies can include monitoring a rate of notifications for a user per x amount of time, to identify that the user may be taking some action that has been defined by policy as an anomaly. For example, is the user downloading an excessive amount of content, as defined by configured policy? If a user has 100K files, and starts downloading them, after the first 100 notifications in few seconds or a minute, the admin may receive an alert that triggers that something is wrong, so there is a need to stop user. In this case, the human administrator can take one of multiple options of alienating or blocking the user, and/or requiring further credentials for permission to continue the actions.

One example action that

Figure 7A:
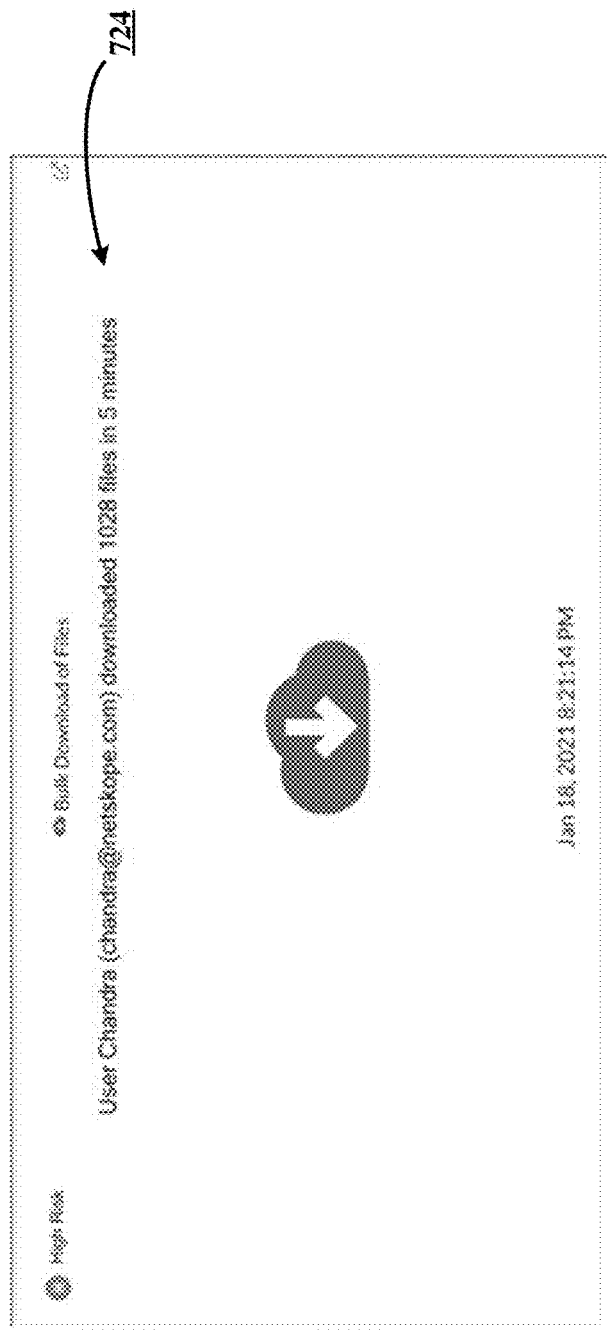
FIG. 7A depicts an example alert, a message for the administrator.
Figure 7B:
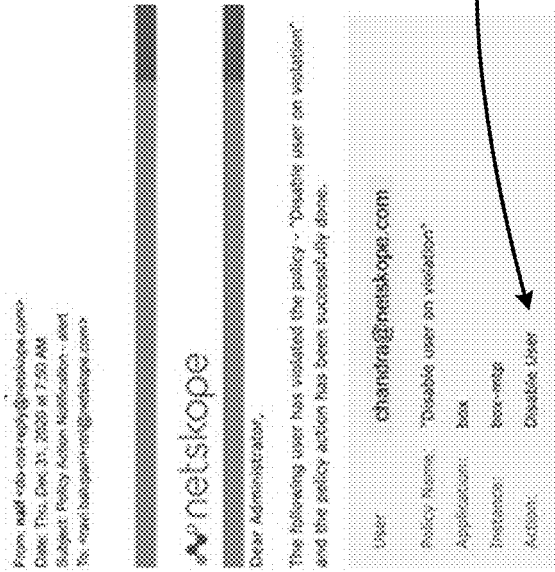
FIG. 7B shows an example email that the administrator receives when a power user violates the configured policy.

FIG. 7A depicts an example alert 372, a message 724 for the administrator that power user Chandra downloaded 1028 files in five minutes. FIG. 7B shows an example email that the administrator receives when a power user violates the configured policy, in one embodiment of the disclosed technology. In this example, the power user has been disabled 774 due to the violation.

Figure 8:
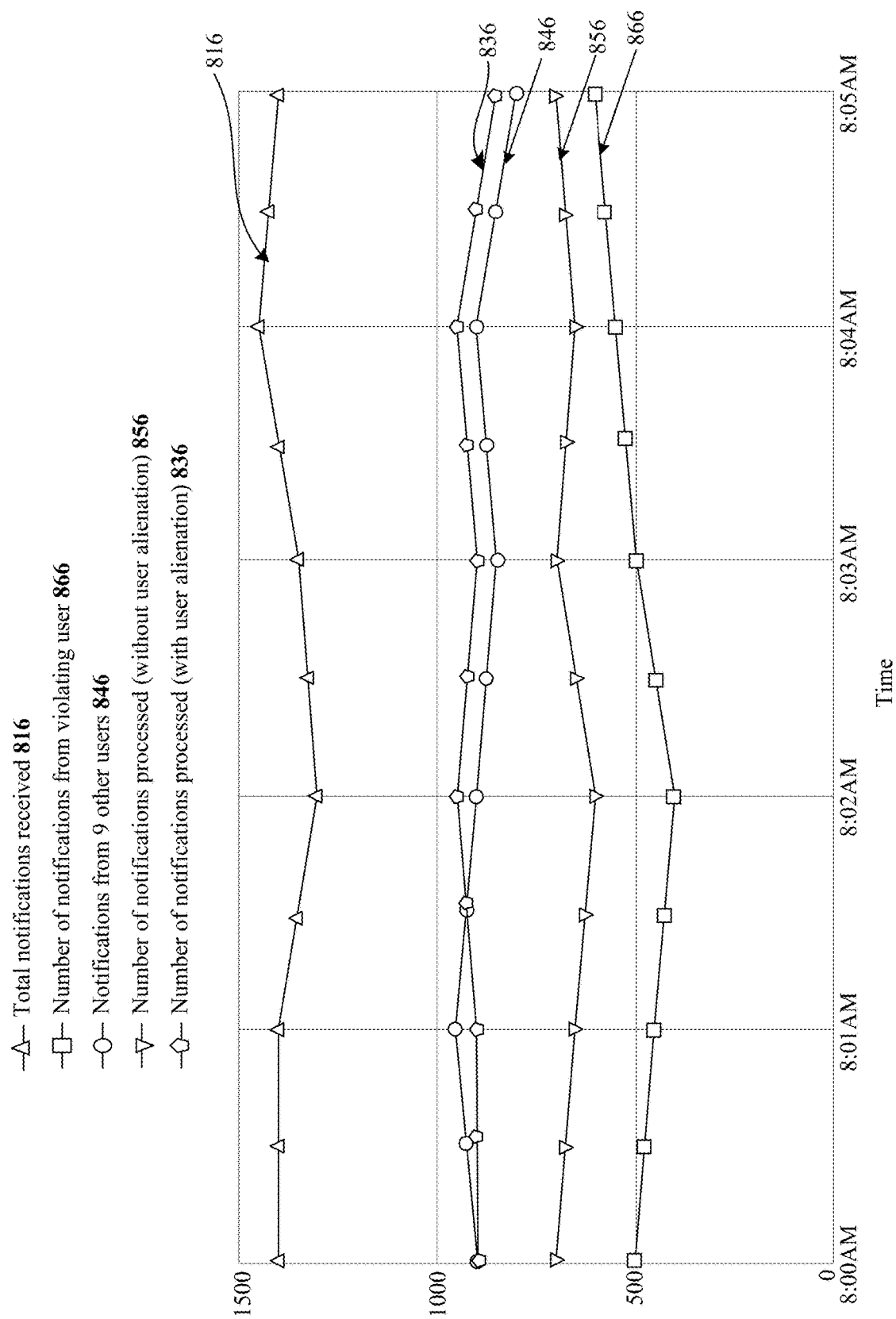
FIG. 8 illustrates reduced latency for nine of ten users, with a graph of API events received over a five minute time period, with transmittal of API event submissions from the power user to the SaaS rationed via the disclosed method.

FIG. 8 illustrates a graph showing reduced latency for nine of ten users, showing API events received over a five minute time period. The graph shows the effects of rationing transmittal of API event submissions from the power user to the SaaS rationed via the disclosed method. The total number of API event notifications received 816, which is close to 1500 notifications, is shown by the curve nearest the top of the graph. The graph shows a curve of the number of notifications from the violating user (power user) 866 as approximately 500 events and the notifications from nine other users 846. Two scenarios are depicted via the remaining curves. In one scenario, no user is alienated. That is, the SaaS limits (throttles) API events for all active users, after their composite threshold is reached, and the total number of notifications processed with no user alienation 856 is the curve just higher than the curve of number of notifications for just the power user 866. In a second scenario, users are monitored and the power user is recognized as submitting a greater volume in time of API events, in excess of a limit. Transmittal of the power user's API event submissions are rationed, to avoid triggering of the throughput penalty for the user group. In this second scenario, the number of notifications processed with user alienation 836 of the power user is much higher, at close 1000 API event notifications. That is, the latency for the users in the user group other than the power user is reduced and the latency for the power user is increased. It only becomes necessary to slow down the API event rate for the power user when the total demand for processing of API event notifications exceeds a limit triggered by the SaaS.

In a different action, when a power user is recognized, active analyzer 165 can set up a separate queue for processing the power user's event notifications, to protect the resources of the remaining users of the organization's user group. The disclosed process includes monitoring the API event rate or volume in time based on counting by one or more active analyzers of API event requests being submitted to the SaaS vendor in that embodiment. Rationing can be done by assigning the power user to an auxiliary API event queue, managed by a proxy, that slows a rate of submission to the SaaS vendor by the power user. The auxiliary API event queue assignment can be lifted when an updated rate or volume of API event submissions by the power user drops below a reinstatement limit, or when an updated rate or volume of API event submissions by the user group, overall, no longer exceeds the SaaS imposed trigger. In another case, the auxiliary API event queue assignment can be lifted when the auxiliary API event queue is empty or has been below a queue depth limit for a predetermined time. In another case, rationing can be by a proxy assigning the power user to an overflow API event channel that separates processing of submissions on behalf of the power user from submissions on behalf of other users in the user group, and lifting the overflow API event channel assignment when an updated rate or volume of API event submissions by the power user drops below a reinstatement limit. In other cases, lifting the overflow API event channel assignment can be configured for when an updated rate or volume of API event submissions by the user group, overall, no longer exceeds the SaaS imposed trigger, or when the auxiliary API event queue is empty or has been below a queue depth limit for a predetermined time. In some cases, the SaaS can separately meter use of the overflow API event channel.

We describe a workflow for avoiding throughput penalties imposed by SaaS vendors on a user group due to excessive API events from users in the user group next.

Workflow

Figure 9:
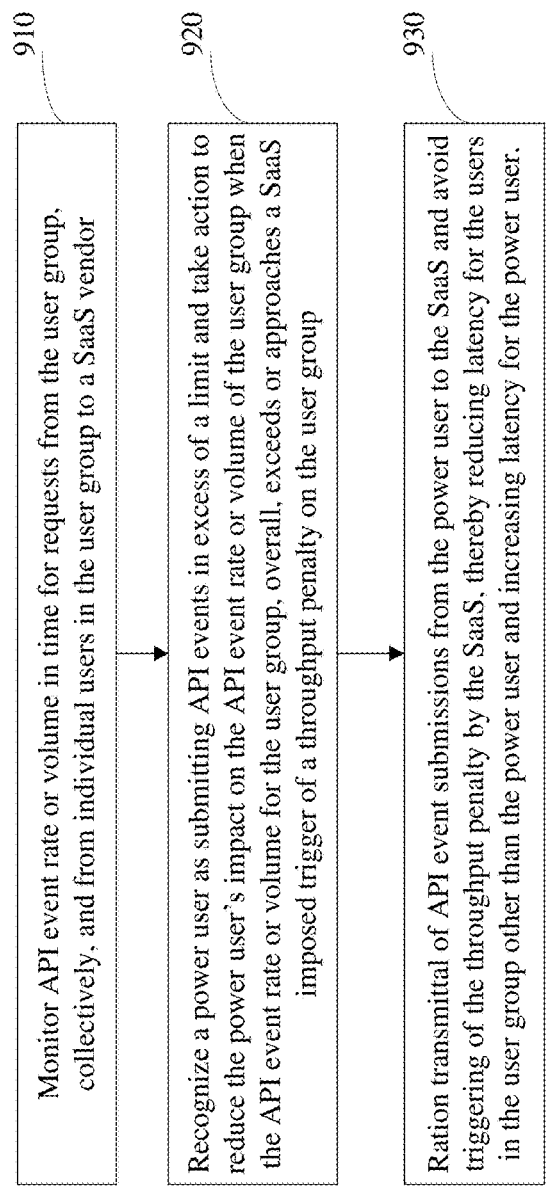
FIG. 9 illustrates a representative workflow for a method for avoiding throughput penalties imposed by SaaS vendors on a user group due to excessive API events from users in the user group in accordance with an implementation of the technology disclosed.

FIG. 9 shows a representative method of avoiding throughput penalties imposed by SaaS vendors on a user group due to excessive API events from users in the user group. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 9 begins with action 910, which includes monitoring API event rate or volume in time for requests from the user group, collectively, and from individual users in the user group to a SaaS vendor.

Process 900 continues at action 920 recognizing a power user as submitting API events in excess of a limit and taking action to reduce the power user's impact on the API event rate or volume of the user group when the API event rate or volume for the user group, overall, exceeds or approaches a SaaS imposed trigger of a throughput penalty on the user group.

Action 930 includes rationing transmittal of API event submissions from the power user to the SaaS and avoiding triggering of the throughput penalty by the SaaS, thereby reducing latency for the users in the user group other than the power user and increasing latency for the power user.

Other implementations of the method described in this section can include a non-transitory computer readable storage medium storing instructions executable by a processor to perform any of the methods described above. Yet other implementations of the methods described in this section can include a system including memory and one or more processors operable to execute instructions, stored in the memory, to perform any of the methods described above.

Computer System

Figure 10:
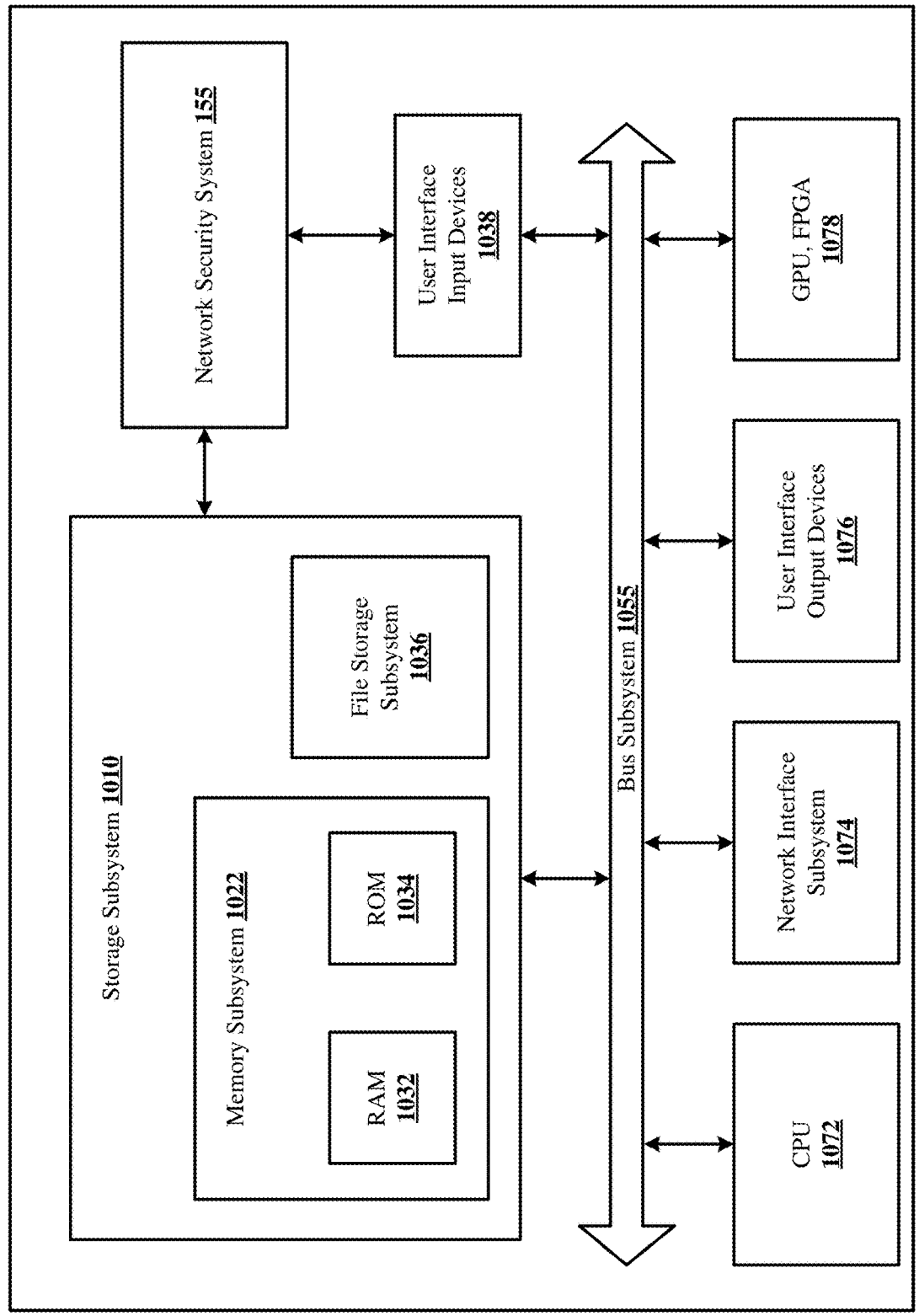
FIG. 10 is a simplified block diagram of a computer system that can be used for avoiding throughput penalties imposed by SaaS vendors on a user group due to excessive API events from users in the user group, in accordance with an implementation of the disclosed technology.

FIG. 10 is a simplified block diagram of a computer system 1000 that can be used for avoiding throughput penalties imposed by SaaS vendors on a user group due to excessive API events from users in the user group. Computer system 1000 includes at least one central processing unit (CPU) 1072 that communicates with a number of peripheral devices via bus subsystem 1055, and network security system 155 for providing network security services described herein. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, network security system 155 of FIG. 1 is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.

Particular Implementations

Some particular implementations and features for avoiding throughput penalties imposed by SaaS vendors on a user group due to excessive API events from users in the user group are described in the following discussion.

In one disclosed implementation, a disclosed method of avoiding throughput penalties imposed by SaaS vendors on a user group due to excessive API events from users in the user group includes monitoring API event rate or volume in time for requests from the user group, collectively, and from individual users in the user group to a SaaS vendor. The method also includes recognizing a power user as submitting API events in excess of a limit and taking action to reduce the power user's impact on the API event rate or volume of the user group. Taking action can be limited to circumstances when the API event rate or volume for the user group, overall, exceeds or approaches a SaaS imposed trigger of a throughput penalty on the user group. The disclosed method further includes rationing transmittal of API event submissions from the power user to the SaaS and avoiding triggering of the throughput penalty by the SaaS, thereby reducing latency for the users in the user group other than the power user and increasing latency for the power user.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In one implementation, the disclosed method of monitoring the API event rate or volume can be handled based on notifications from the SaaS vendor of API events for the user group, with SaaS-implemented notifications to a collector. In an alternative implementation, monitoring of the API event rate or volume can be handled based on counting by one or more active analyzers of API event requests being submitted to the SaaS vendor, with applicant implemented notifications to a collector.

The rationing can include cutting off the power user from making API event submissions to the SaaS. This can apply to a bot programmed to generate the API events. It can be accompanied by sending a notification to a human user to follow up on the cut-off.

The rationing can include temporarily suspending the power user from making API event submissions to the SaaS. This can apply to a bot programmed to generate the API events. It can be for a predetermined time or until overall submissions by the user group no longer exceed the SaaS imposed trigger. It can be accompanied by sending a notification to a human user to follow up on the temporary suspension.

The rationing can include assigning the power user to an auxiliary API event queue, managed by a proxy, that slows, and in some cases throttles, a rate of submission on behalf of the power user. Assignment to the auxiliary API event queue can be lifted when an updated rate or volume of API event submissions by the power user drops below a reinstatement limit. Assignment to the auxiliary API event queue can be lifted when an updated rate or volume of API event submissions by the user group, overall, no longer exceeds the SaaS imposed trigger. Assignment to the auxiliary API event queue can be lifted when the auxiliary API event queue is empty or has been below a queue depth limit for a predetermined time. SaaS can separately meter use of the overflow API event channel in some implementations.

The rationing can include assigning the power user to an overflow API event channel, managed by a proxy, that separates meeting of submissions on behalf of the power user from submissions on behalf of other users in the user group. Use of the overflow API event channel can be separately charged by the SaaS. Assignment to the overflow API event channel can be lifted when an updated rate or volume of API event submissions by the power user drops below a reinstatement limit. Assignment to the overflow API event channel can be lifted when an updated rate or volume of API event submissions by the user group, overall, no longer exceeds the SaaS imposed trigger. In some implementations the SaaS separately meters use of the overflow API event channel.

Other implementations of the methods described in this section can include a tangible non-transitory computer readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of preventing invocation of a throughput penalty imposed by software as a service (abbreviated SaaS) vendor on a group due to excessive application program interface (abbreviated API) events from at least one power user, including:
   monitoring API event rate or volume in time for requests from users in a user group, both individually and as registered members of the user group to a SaaS vendor;
   identifying, based on the monitoring, a power user registered as member of the user group who submits API events in excess of a limit and taking action to reduce impact of the power user on the API event rate or volume of the user group, overall, at least when the API event rate or volume for the user group, overall, exceeds or approaches a SaaS vendor imposed trigger for imposition of the throughput penalty on the user group; and
   on behalf of the user group, rationing transmittal of API event submissions from the power user to the SaaS vendor by assigning the power user to an auxiliary API event queue managed by a proxy that slows a rate of submission to the SaaS vendor by the power user, thereby avoiding triggering of the throughput penalty by the SaaS vendor.

2. The method of claim 1, further including monitoring the API event rate or volume in time based on notifications from the SaaS vendor of API events for the user group.

3. The method of claim 1, further including monitoring the API event rate or volume in time based on counting by one or more active analyzers of API event requests being submitted to the SaaS vendor.

4. The method of claim 1, further including rationing by one of cutting off and temporarily suspending the power user from making API event submissions to the SaaS.

5. The method of claim 4, wherein the power user is a bot programmed to generate the API events.

6. The method of claim 4, further including sending a notification to a human user to follow up on the cutting off or temporarily suspending.

7. The method of claim 4, wherein the temporarily suspending is for a predetermined time or until overall submissions by the user group no longer exceed the SaaS imposed trigger.

8. The method of claim 1, further including lifting assignment to the auxiliary API event queue when an updated rate or volume of API event submissions by the power user drops below a reinstatement limit.

9. The method of claim 1, further including lifting assignment to the auxiliary API event queue when an updated rate or volume of API event submissions by the user group, overall, no longer exceeds the SaaS imposed trigger.

10. The method of claim 1, further including lifting assignment to the auxiliary API event queue when the auxiliary API event queue is empty or has been below a queue depth limit for a predetermined time.

11. A method of preventing invocation of a throughput penalty imposed by software as a service (abbreviated SaaS) vendor on a group due to excessive application program interface (abbreviated API) events from at least one power user, including:
monitoring API event rate or volume in time for requests from users in a user group, both individually and as registered members of the user group to a SaaS vendor;
identifying, based on the monitoring, a power user registered as member of the user group who submits API events in excess of a limit and taking action to reduce impact of the power user on the API event rate or volume of the user group, overall, at least when the API event rate or volume for the user group, overall, exceeds or approaches a SaaS vendor imposed trigger for imposition of the throughput penalty on the user group, and
on behalf of the user group, rationing transmittal of API event submissions from the registered power user to the SaaS vendor by assigning the registered power user to an overflow API event channel, managed by a proxy, through an auxiliary API event queue that separates processing of submissions on behalf of the registered power user from submissions on behalf of other users in the user group, thereby avoiding triggering of the throughput penalty by the SaaS vendor.

12. The method of claim 11, further including lifting assignment to the overflow API event channel when an updated rate or volume of API event submissions by the power user drops below a reinstatement limit.

13. The method of claim 11, further including lifting assignment to the overflow API event channel when an updated rate or volume of API event submissions by the user group, overall, no longer exceeds the SaaS imposed trigger.

14. The method of claim 11, further including lifting assignment to the overflow API event channel when the overflow API event channel is empty or has been below a queue depth limit for a predetermined time.

15. The method of claim 11, wherein the SaaS separately meters use of the overflow API event channel.

16. A tangible non-transitory computer readable storage medium, including program instructions loaded into memory that, when executed on hardware processors, cause the hardware processors to implement steps for preventing invocation of a throughput penalty imposed by software as a service (abbreviated SaaS) vendor on a group due to excessive application program interface (abbreviated API) events from at least one power user, the steps including:
monitoring API event rate or volume in time for requests from users in a user group, both individually and as registered members of the user group to a SaaS vendor;
identifying, based on the monitoring, a power user registered as member of the user group who submits API events in excess of a limit and taking action to reduce impact of the power user on the API event rate or volume of the user group, overall, at least when the API event rate or volume for the user group, overall, exceeds or approaches a SaaS vendor imposed trigger for imposition of the throughput penalty on the user group; and
on behalf of the user group, rationing transmittal of API event submissions from the power user to the SaaS vendor by assigning the power user to an auxiliary API event queue managed by a proxy that slows a rate of submission to the SaaS vendor by the power user, thereby avoiding triggering of the throughput penalty by the SaaS vendor.

17. The tangible non-transitory computer readable storage medium of claim 16, the steps further including monitoring the API event rate or volume in time based on notifications from the SaaS vendor of API events for the user group.

18. The tangible non-transitory computer readable storage medium of claim 16, the steps further including rationing by one of cutting off and temporarily suspending the power user from making API event submissions to the SaaS.

19. The tangible non-transitory computer readable storage medium of claim 18, the steps further including sending a notification to a human user to follow up on the cutting off or temporarily suspending.

20. The tangible non-transitory computer readable storage medium of claim 18, wherein the temporarily suspending is for a predetermined time or until overall submissions by the user group no longer exceed the SaaS imposed trigger.

21. A device for preventing invocation of a throughput penalty imposed by software as a service (abbreviated SaaS) vendor on a group due to excessive application program interface (abbreviated API) events from at least one power user, the device including a processor, memory coupled to the processor, and computer instructions loaded into the memory that, when executed, cause the processor to implement steps that include:
monitoring API event rate or volume in time for requests from users in a user group, both individually and as registered members of the user group to a SaaS vendor;
identifying, based on the monitoring, a power user registered as member of the user group who submits API events in excess of a limit and taking action to reduce impact of the power user on the API event rate or volume of the user group, overall, at least when the API event rate or volume for the user group, overall, exceeds or approaches a SaaS vendor imposed trigger for imposition of the throughput penalty on the user group; and
on behalf of the user group, rationing transmittal of API event submissions from the power user to the SaaS vendor by assigning the power user to an auxiliary API event queue managed by a proxy that slows a rate of submission to the SaaS vendor by the power user, thereby avoiding triggering of the throughput penalty by the SaaS vendor.

22. The device of claim 21, the steps further including monitoring the API event rate or volume in time based on counting by one or more active analyzers of API event requests being submitted to the SaaS vendor.

23. The device of claim 21, the steps further including lifting assignment to the auxiliary API event queue when at least one of the following occurs:
- an updated rate or volume of API event submissions by the power user drops below a reinstatement limit,
- an updated rate or volume of API event submissions by the user group, overall, no longer exceeds the SaaS imposed trigger, and
- the auxiliary API event queue is empty or has been below a queue depth limit for a predetermined time.

\* \* \* \* \*